April 4, 1939.     T. C. HANA     2,152,690
MAGNETIC TESTING
Filed June 17, 1937
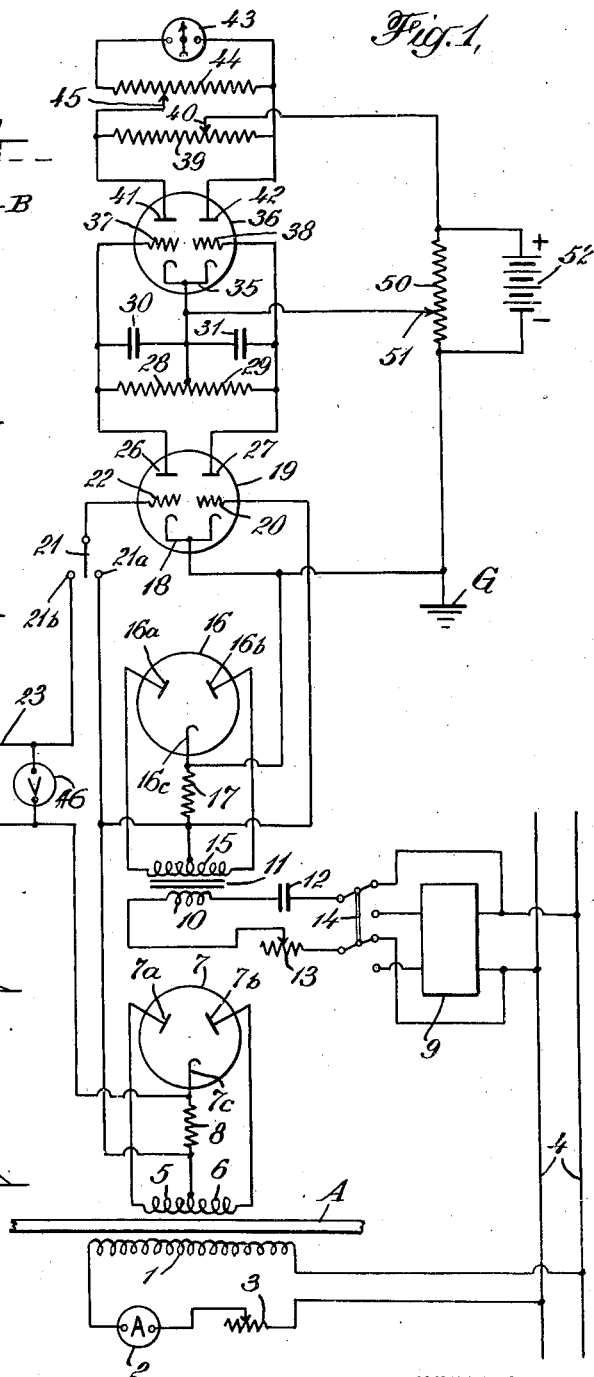
INVENTOR
Thomas C. Hana.
BY
ATTORNEYS Patented Apr. 4, 1939

2,152,690

UNITED STATES PATENT OFFICE 2,152,690

MAGNETIC TESTING

Thomas C. Hana, Flushing, N. Y., assignor to Magnetic Analysis Corporation, a corporation of New York Application June 17, 1937, Serial No. 148,645

5 Claims. (Cl. 175—183)

This invention relates to electrical measurement and particularly to the determination of the wave form of alternating electrical quantities in magnetic analysis. It represents improvements and modifications in the method and apparatus described in co-pending applications Serial Nos. 136,824 and 136,825, both filed April 14, 1937, by Theodor Zuschlag.

Modern methods and apparatus for magnetic analysis are, at best, somewhat complicated and modifications which simplify commercial testing apparatus and increase reliability within the limits of accuracy required represent marked advances in the art, even when the modification entails the sacrifice of refinements which are only necessary in precision testing. In other words, in commercial magnetic testing it is desirable to simplify apparatus and procedure as long as the results are sufficient for commercial purposes.

In magnetic analysis involving the determination of the wave form of an alternating electrical potential experience has shown that the potential curve is usually symmetrical. In other words, the positive nodes are similar to the negative nodes. Under such conditions, it may be sufficient to investigate alternate half cycles of the same sign with the apparatus discussed in the aforementioned prior application. However, I have found that it is also possible, and from a commercial standpoint desirable, to rectify the potential and investigate successive cycles of the resulting rectified potential. This change in procedure permits considerable simplification of testing apparatus.

The method of wave form determination according to my invention comprises impressing a rectified signal voltage on a circuit, introducing into the circuit a bias voltage sufficient to prevent the flow of current past a point in said circuit, reducing said bias voltage for a brief interval at corresponding instants in successive cycles of the rectified signal voltage to permit a flow of current past the point in said circuit and determining the current flow past the point in said circuit when said bias voltage is reduced.

My invention will be more clearly understood if reference is made to the following detailed description taken in conjunction with the accompanying drawing in which Fig. 1 is a circuit diagram of a presently preferred form of the apparatus of my invention;

Fig. 2 illustrates the combination of a rectified signal voltage and a bias voltage in the apparatus of Fig. 1;

Figs. 3a and 3b illustrate current impulses set up in the resistances 28, 29 of the apparatus of Fig. 1; and Figs. 4a and 4b illustrate the discharge of the condensers 30, 31 of the apparatus of Fig. 1.

Referring now to Fig. 1 it will be observed that a primary winding 1 (preferably of low ohmic resistance) is connected in series with an ammeter 2 and with a variable current limiting resistor 3 to an alternating current supply line 4 such, for example, as a 60 cycle commercial power supply line. A current limiting reactor provided with changeable taps or a removable magnetic core may be employed, if desired, in place of the resistor 3.

Disposed symmetrically in inductive relation with the primary winding 1 are two secondary windings 5, 6 which are similar to each other and preferably matched as to resistance, inductance, and self capacity. These secondary windings are connected to each other in series aiding. Their outer ends are connected respectively to plates 7a, 7b, of a rectifying tube 7, while their common point is connected to a cathode 7c of this tube in series with a fixed resistance 8.

The power supply line 4 is also connected to a phase shifting transformer 9, the output of which is connected to the input winding 10 of a full wave rectifying transformer 11 in series with a condenser 12 and a resistance 13. The input circuit 10, 12, 13 is connected to the output of the phase shifting transformer 9 through a two-pole double-throw switch 14, which latter also permits a direct coupling of the input circuit 10, 12, 13, to the power supply line 4.

The full wave rectifying transformer 11 is provided with a secondary output winding 15 the ends of which are connected respectively to plates 16a, 16b of a full wave rectifier tube 16. The midpoint of the output winding 15 is connected to cathode 16c of the full wave rectifier tube through a fixed resistor 17.

The end of the fixed resistor 17 adjacent the cathode 16c is grounded, for convenience, at G and is also connected to twin cathodes 18 of a detector tube 19.

The end of the fixed resistor 17 remote from the cathode 16c is connected to one pole 21a of a single-pole double-throw switch 21, the contact arm of which is connected to the grid 22 of the detector tube 19 which is also equipped with a similar grid 20.

The other pole 21b of the switch 21 is connected with a slider 23 of a potentiometer 24. An external direct current source 25 is connected to the two ends of the potentiometer 24 to provide for the energization of the latter. The upper end of the potentiometer is connected to the negative pole of the power source, and the lower end of the potentiometer is connected to the positive pole of the power source. One end of the potentiometer 24 (the lower end as shown in Fig. 1) is connected to the resistor 8 adjacent the cathode 7c.

A voltmeter 46 is connected across the lower end of potentiometer 24 and the slider 23 of this potentiometer.

The amplifier detector tube 19 is provided with a pair of plates 26, 27, which are connected together through like resistors 28, 29, in series. A condenser 30 is shunted across the resistor 28 and a similar condenser 31 is shunted across the resistor 29. The common point of the two condensers is connected to a twin cathode 35 of an amplifier tube 36. Grids 37, 38, of this tube are connected respectively to the plates 26, 27, of the amplifier detector tube 19. The amplifier tube 36 is also provided with a pair of plates 41, 42, which are connected respectively to the ends of a potentiometer 39, which is provided with a slider 40. One end of the potentiometer 39 is connected to a slider 45 of another potentiometer 44, while the opposite end of the potentiometer 39 is connected to an end of the potentiometer 44.

A sensitive direct current galvanometer 43 is connected across the ends of the potentiometer 44.

An additional potentiometer 50 is connected at one end (the upper end in Fig. 1) to the slider 40 of the potentiometer 39, while the other end is connected to the ground at G. The potentiometer 50 is provided with a slider 51 which is connected to the lead between the common points of the condensers 30, 31 and the twin cathodes 35 of the tube 36. A source of direct current 52 is connected across the potentiometer 50. (The upper or positive pole of the source 52 is connected to the upper end of the potentiometer 50.)

Means (not shown) are provided for inserting a magnetizable body "A" to be tested in the field of the primary winding 1. The primary winding 1 and the two secondary windings 5 and 6 are preferably disposed concentrically with each other so that the specimen may be inserted through them.

The principles of operation of the apparatus of Fig. 1 may be explained as follows:

If an alternating current be supplied to the primary winding 1, alternating electromotive forces will be induced in the secondary windings 5 and 6. The magnitude of the primary current supplied to the winding 1 may be controlled by the variable resistor 3 and read on the ammeter 2.

The alternating electromotive forces produced in coils 5 and 6 are imposed upon the plates 7a, 7b, of the tube 7 and rectified, thus producing a rectified signal voltage (shown as curve S on Fig. 2). If switch 21 is closed to the left, a resultant full wave rectified signal voltage across resistor 8 is imposed between the left grid 22 and the twin cathode 18 in series with the potentiometer 24 and the resistor 17. In other words, the rectified signal voltage is impressed in series with the resistor 17 across the grid 22 of the detector tube and the cathode 18. Thus a voltage is supplied to the grid 22 in such a manner that it tends to increase the current flow to the plate 26 of the tube 19 through the resistor 28 and thereby produces a voltage difference between the grid 37 of the amplifier tube 36 and the cathode 35 of this tube. (It will be noted that the plate current is supplied to the plate 26 through the resistor 28 from the potentiometer 50, which in turn is energized by the direct current source 52.)

At the same time that the signal voltage from the coils 5 and 6 is being rectified and impressed between grid and cathode of the tube 19 (as just described) a full wave rectified bias voltage of like frequency is created and imposed across the resistance 17. The creation of this bias potential is simple. Current taken directly from the supply line 4 or from the transformer 9 is imposed upon the primary of the transformer 11. Electrical potentials are thus set up in the two halves of the secondary 15 of the transformer 11, and rectified by the rectifier 16 to produce a full wave rectified bias voltage shown as curve B on Fig. 2.

The signal voltage to be analyzed is indicated as curve S on Fig. 2, while the curve T is the resultant of the rectified bias and signal voltage. The phase relationship between the bias voltage B and the signal voltage S may be varied by varying the setting of the phase shifting transformer 9, or if the potential is supplied directly from the line to the transformer 11 there will be a fixed difference in phase between the signal voltage and the bias voltage due to the condenser 12. In other words, the curve S may be shifted to the right or left with respect to curve B, or a fixed "out of phase" relationship may be maintained between them.

It will be apparent that the rectified bias voltage is applied to both grids 22, 20 of the detector tube 19 in parallel, and if the switch 21 is closed to the right so that the signal voltage is not imposed on grid 22, like current flow conditions will be imposed upon both the plates 26, 27 of the detector tube 19. During most of the cycle the tube 19 will be biased below cut-off by the full wave rectified voltage, but when the bias voltage rises above cut-off potential (as indicated at point U, for example, on Fig. 2) small and equal plate current impulses will occur at the same time in the resistances 28, 29. Such small current impulses are illustrated in Fig. 3a, and serve to charge the respective condensers 30, 31.

During the portion of each cycle when the detector tube is not conductive (indicated by the V portion of the curve T on Fig. 2) the condensers 30 and 31 will discharge as shown in Fig. 4a. (The presence of the condensers in the circuit smooths the current impulses supplied to the galvanometer 43 and thereby improves the operation.) However, since the charges on both sides of the plate or output circuit of the detector tube are equal they balance each other and, if the amplifier tube 36 is balanced, i. e. if the potential drops between plates 41 and 42 and slider 40 are identical, no voltage is imposed upon the galvanometer 43, and it will not be deflected.

If now the switch 21 is closed to the left, the rectified signal voltage is imposed on the grids 22 and 20 in series while the bias voltage is imposed on these grids in parallel. This creates an unbalanced condition, and the impulses at the plate 26 will no longer be like those at plate 27 of the detector tube. Consequently the currents through the resistances 28 and 29 will be unequal and the condensers 30 and 31 will be unequally charged. Thus the current impulses supplied to one of the resistances 28, 29 will be to the current supplied to the other as the impulses indicated on Fig. 3a are to the impulses indicated on Fig. 3b. Likewise the discharge from one of the condensers 30, 31 will be to the discharge of the other condenser as the discharge indicated on Fig. 4a is to the discharge indicated on Fig. 4b. Under these circumstances there will be an indication of current at the galvanometer 43.

In order to restore the galvanometer 43 to its original position the effect of the signal voltage may be balanced out with direct current potential from the source 25 imposed upon the circuit in regulated magnitude through the potentiometer 24.

The function of the tube 36 is one of amplification, and for this purpose it receives plate current through the potentiometer 50. The potentiometer 39 is employed for obtaining balanced conditions in the circuit; the potentiometer 44 serves to control the sensitivity and degree of deflection of the meter 43, and the potentiometer 50 serves to establish optimum plate currents in both the amplifier tube 36 and the detector tube 19.

Bearing the above fundamentals in mind, the operation of the apparatus may be explained as follows:

Metallurgical characteristics of a magnetizable body are indicated by changes in the phase, amplitude and wave form of an electrical potential set up in a conductor disposed in inductive relationship with the body. Certain characteristics, such as hardness, may be indicated by a change in the magnitude of the wave at some particular phase in each cycle. The instant apparatus permits an investigation of the magnitude of the wave at any phase in the cycle, and hence by a series of readings it is possible to reproduce the wave form. However, in most commercial work it is sufficient to investigate the magnitude of the wave at one or two predetermined points with respect to phase. An investigation of this character is carried out by first establishing the phase point at which the wave of the signal voltage should be investigated, by establishing a phase difference between signal voltage and the bias voltage with the phase shifter 9 or the condenser 12. Then with the switch 21 closed to the right to eliminate any effect of signal voltage upon the detector tube 19, the bias voltage (which should have an amplitude several times that of the signal voltage) is impressed upon the detector tubes. The circuit is then adjusted to get a maximum deflection of the galvanometer 43 with a minimum amount of potential by adjusting the slider 51 on the potentiometer 50. Then the galvanometer 43 is brought to a zero position by adjustment of the slider 40 of the potentiometer 39.

With a magnetic specimen of known and desired magnetic characteristics in the field of the primary winding 1, the switch 21 is next closed to the left. A deflection will probably occur at the galvanometer 43, but this deflection is wiped out by adjusting the slider 23 of the potentiometer 24 to introduce a D. C. potential to equal and oppose the signal voltage impulse at the particular phase in question. This having been done, the standard is replaced by a magnetic specimen of unknown characteristics. If the standard and the specimen are dissimilar with respect to a characteristic indicated in the particular phase of the signal potential being investigated, there will be a deflection of galvanometer 43. If such a deflection occurs, the specimen is not up to standard and should be rejected.

By varying the setting of the phase shifting transformer it is possible to change the phase relationship between the full wave rectified bias voltage imposed across the resistor 17 and the signal voltage imposed across coils 5 and 6.

If a complete picture of the signal voltage in any particular case is desired, the galvanometer 43 is brought to zero by adjusting the potentiometer 23 and the reading of the voltmeter 46 is taken. This measures the amplitude of the signal voltage for the particular phase setting. Then the phase setting is shifted by changing the position of the phase shifter and the operation is repeated. This gives the magnitude of the signal voltage for the new phase setting. By repeating this operation for a number of phase settings the amplitude of the wave at several phase settings is obtained. By plotting the amplitude readings against the respective phase readings, the wave of the rectified signal voltage is reproduced.

The duration of the time interval in which the tube 19 is conductive is determined by the magnitude of the full wave rectified bias voltage produced in the rectifier 16 and imposed across resistor 17. The magnitude of this voltage can be adjusted, in case it is desirable or necessary, by changing the value of the resistor 18. In general, the maximum amplitude of the bias voltage should be 4 or 5 times that of the signal voltage.

The introduction of a D. C. potential at the potentiometer 24 to neutralize the effect of the signal voltage will be recognized as a null method. By the use of this null method "nonlinearities" of the tubes 19 and 36 do not interfere with the accuracy of the measurements, provided of course that the circuit was properly balanced and adjusted to start with. It must be borne in mind, however, the particular arrangement described above averages the individual amplitude values for two successive half cycles of the unrectified signal voltage and therefore does not produce a true picture of the signal voltage unless its successive unrectified half cycles were similar except as to sign. This fact, however, is of minor importance in most magnetic analysis testing problems, because generally it is not necessary to differentiate between the amplitude values of successive half cycles.

I claim:

1. In a method of magnetic analysis which involves producing an alternating signal voltage in a circuit and influencing said voltage by disposing a magnetizable body to be analyzed in inductive relationship with the circuit, the improvement which comprises rectifying the signal voltage in the circuit, introducing a bias voltage in the circuit sufficient to prevent the flow of current past a point in said circuit, reducing said bias voltage for a brief interval at corresponding instants in successive cycles of the signal voltage to permit a flow of current past said point, and determining the current flow past said point in said circuit when said bias voltage is reduced.

2. In a method of magnetic analysis which involves inducing an alternating signal voltage in a secondary circuit through the medium of a magnetizable body to be analyzed, the improvement which comprises rectifying the signal voltage in the circuit, introducing into the circuit a bias voltage sufficient to prevent the flow of current past a point in said circuit, reducing said bias voltage for a brief interval at corresponding instants in successive cycles of the rectified signal voltage and determining the current flow past said point in said circuit when said bias voltage is reduced.

3. In a magnetic analysis apparatus having a winding disposable in inductive relationship to a magnetizable body, a first circuit connected to said winding and means for inducing in said winding a signal voltage characteristic of physical properties of the magnetizable body, the improvement which comprises a vacuum tube detector having its input side connected to said first circuit and provided with an output circuit, means for rectifying the signal voltage in the first circuit, means for impressing on said detector tube a bias voltage of magnitude such that the tube is rendered non-conductive except during brief corresponding intervals in successive cycles of the signal voltage, and means for measuring the output of the tube during said intervals.

4. A method of determining an instantaneous value of a signal voltage in successive cycles thereof which comprises impressing the signal voltage on a circuit, rectifying said signal voltage in the circuit, introducing a bias voltage into the circuit sufficient to prevent the flow of current past a point in said circuit, reducing said bias voltage for a brief interval at corresponding instants in successive cycles of the signal voltage to permit a flow of current past the point in said circuit and determining the current flow past the point in said circuit when said bias voltage is reduced.

5. In apparatus for determining the wave form of electrical quantities including a vacuum tube detector having its input side connected to a first circuit and provided with an output circuit, means for impressing a signal voltage in the first circuit, means for impressing on said tube a bias voltage of varying magnitude such that the tube is rendered non-conductive except during brief corresponding intervals in successive cycles of a signal voltage, and means for measuring the output of the tube during said intervals, the improvement which comprises means in said first circuit for rectifying the signal voltage.

THOMAS C. HANA.